(12) United States Patent
Clevorn (10) Patent No.: US 10,211,877 B2
(45) Date of Patent: Feb. 19, 2019

(54) MULTI-CARRIER DYNAMIC ANTENNA DIVERSITY

(71) Applicant: Intel Corporation, Santa Clara, CA (US)

(72) Inventor: Thorsten Clevorn, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/269,193

(22) Filed: Sep. 19, 2016

(65) Prior Publication Data

US 2018/0083664 A1 Mar. 22, 2018

(51) Int. Cl.
| | |
|---|---|
| *H04B 1/00* | (2006.01) |
| *H04B 7/06* | (2006.01) |
| *H04B 1/44* | (2006.01) |
| *H04B 7/04* | (2017.01) |
| *H04W 52/02* | (2009.01) |
| *H04W 52/26* | (2009.01) |
| *H04B 7/08* | (2006.01) |
| *H04B 17/318* | (2015.01) |

(52) U.S. Cl.
CPC ............ *H04B 1/44* (2013.01); *H04B 1/005* (2013.01); *H04B 7/04* (2013.01); *H04B 7/0691* (2013.01); *H04B 7/0874* (2013.01); *H04B 17/318* (2015.01); *H04W 52/0203* (2013.01); *H04W 52/0225* (2013.01); *H04W 52/0274* (2013.01); *H04W 52/265* (2013.01)

(58) Field of Classification Search
None
See application file for complete search history.

(56) References Cited

U.S. PATENT DOCUMENTS

| | | | | |
|---|---|---|---|---|
| 6,018,651 A | * | 1/2000 | Bruckert | H04B 7/0857 375/347 |
| 6,463,054 B1 | * | 10/2002 | Mazur | H04W 48/18 370/328 |
| 7,636,554 B2 | * | 12/2009 | Sugar | H04B 1/005 455/272 |
| 8,538,472 B2 | | 9/2013 | Dawid et al. | |
| 8,737,945 B2 | * | 5/2014 | Jung | H04B 17/0042 455/226.1 |
| 8,843,123 B1 | * | 9/2014 | Perets | H04W 36/0083 455/277.1 |
| 2003/0123530 A1 | * | 7/2003 | Maeda | H04B 7/0842 375/148 |
| 2005/0085197 A1 | | 4/2005 | Laroia et al. | |
| 2006/0223450 A1 | | 10/2006 | Dacosta | |

(Continued)

OTHER PUBLICATIONS

Search Report dated Oct. 12, 2017 for International Application No. PCT/US17/47373.

*Primary Examiner* — Lana N Le
(74) *Attorney, Agent, or Firm* — Schiff Hardin LLP (57) ABSTRACT

An antenna diversity circuit having a plurality of processing chains including first and second processing chains configured to communicate with a first antenna, and process signals for first and second carriers, respectively, and third and fourth processing chains configured to communicate with a second antenna, and process signals for the first and second carriers, respectively; and a dynamic antenna diversity controller configured to activate one or more of the plurality of processing chains based on a predetermined set of criteria.

25 Claims, 4 Drawing Sheets

(56) References Cited

U.S. PATENT DOCUMENTS

| | | |
|---|---|---|
| 2011/0044376 A1* | 2/2011 | Lin ................... H04B 7/0608 455/69 |
| 2011/0110355 A1* | 5/2011 | Murakami ........... H04B 7/0417 370/343 |
| 2012/0320962 A1 | 12/2012 | Takai et al. |
| 2013/0010620 A1* | 1/2013 | Dinan ................ H04W 76/025 370/252 |
| 2013/0089037 A1 | 4/2013 | Negus et al. |
| 2013/0121394 A1 | 5/2013 | Clevorn |
| 2013/0242772 A1 | 9/2013 | Attar et al. |
| 2013/0244665 A1 | 9/2013 | Clevorn et al. |
| 2013/0265890 A1* | 10/2013 | Ali ....................... H01Q 1/246 370/252 |
| 2013/0308483 A1 | 11/2013 | Jalloul et al. |
| 2014/0140424 A1 | 5/2014 | Clevorn |
| 2014/0233665 A1 | 8/2014 | Clevorn et al. |
| 2015/0117345 A1* | 4/2015 | Kim ..................... H04L 5/0091 370/329 |
| 2015/0131601 A1* | 5/2015 | Dinan .................. H04W 72/12 370/329 |
| 2015/0327103 A1 | 11/2015 | Tang et al. |
| 2016/0126994 A1* | 5/2016 | Domino ................. H04B 1/18 455/69 |
| 2016/0365908 A1* | 12/2016 | Chang ................. H04B 7/0602 |
| 2017/0054470 A1* | 2/2017 | Reza ..................... H04B 1/44 |

\* cited by examiner

MULTI-CARRIER DYNAMIC ANTENNA DIVERSITY

TECHNICAL FIELD

The present disclosure relates generally to multi-carrier dynamic antenna diversity taking into consideration carrier aggregation.

BACKGROUND

Antenna diversity is a wireless diversity scheme that uses two or more antennas with respective processing chains to improve the quality and reliability of a wireless link. This scheme may be accomplished in an advanced implementation by dynamically switching the processing chains on and off based on conditions such as radio frequency conditions.

Existing dynamic antenna diversity schemes do not take in consideration carrier aggregation, which is the use of more than one carrier to increase overall transmission bandwidth. Antenna selection could differ by carrier, yet in these existing solutions all carriers have a same antenna diversity setting. A result could be performance or power penalties when individual carriers have different preferred diversity settings. For example, if it is assumed that a first carrier A preferably uses two antennas, and a second carrier B preferably uses one antenna, the dynamic antenna diversity circuit selects for both carriers A and B either one or two antennas. If the antenna diversity circuit selects one antenna, the result is likely a performance degradation for Carrier A. Alternatively, if the antenna diversity circuit selects two antennas, the result is likely unnecessary power consumption by Carrier B because a second processing chain for the second antenna is on despite not being needed.

DESCRIPTION OF THE ASPECTS

The present disclosure is directed to an antenna diversity circuit configured to activate one or more processing chains, which are configured to communicate with antennas, based on conditions of different carriers. Each processing chain for each antenna and each carrier may be controlled separately.

Figure 1:
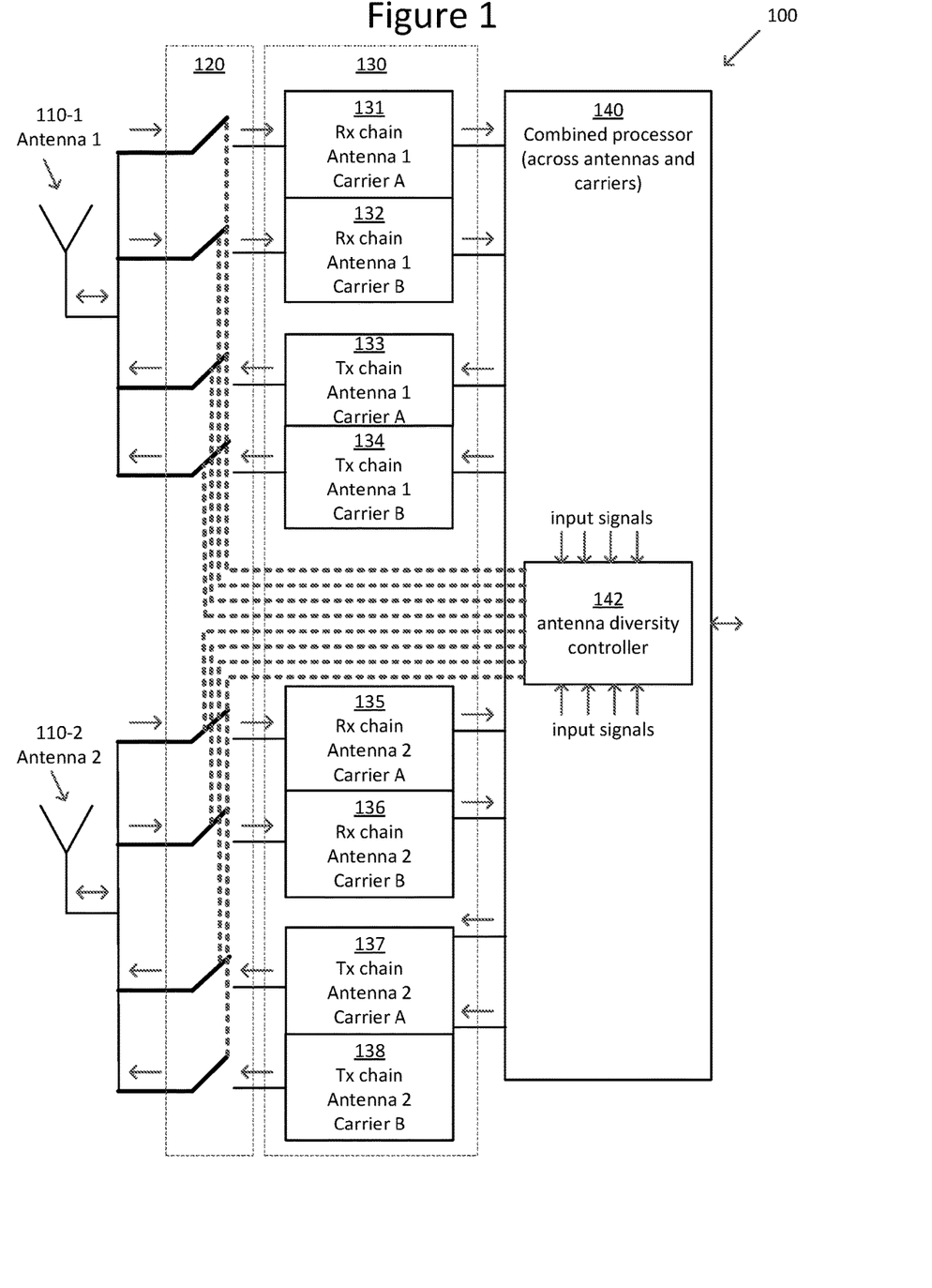
FIG. 1 illustrates a schematic diagram of an antenna diversity circuit in accordance with an aspect of the disclosure.

FIG. 1 illustrates a schematic diagram of an antenna diversity circuit 100 in accordance with an aspect of the disclosure.

The antenna diversity circuit 100 comprises antennas 110, a switching circuit 120, a plurality of processing chains 130, and a combined processor 140.

The antennas 110 comprise a first antenna 110-1 and a second antenna 110-2. While two antennas 110 are shown, the disclosure is not limited in this respect; there may be any number of antennas 110 as suitable for the intended purpose.

The plurality of processing chains 130 comprises first through eighth processing chains 131-138. The first through fourth processing chains 131-134 are configured to communicate with the first antenna 110-1, and the fifth through eighth processing chains 135-138 are configured to communicate with the second antenna 110-2. The first, second, fifth, and sixth processing chains 131, 132, 135, 136 are receive processing chains, which are configured to process received signals. The third, fourth, seventh, and eighth processing chains 133, 134, 137, 138 are transmit processing chains, which are configured to process signals to be transmitted. The first, third, fifth, and seventh processing chains 131, 133, 135, 137 are configured to process signals for a first carrier A, and the second, fourth, sixth, and eighth processing chains 132, 134, 136, 138 are configured to process signals for a second carrier B. A carrier is also known as a channel.

The plurality of processing chains 130 is shown as having a combination of receive processing chains 131, 132, 135, 136 and transmit processing chains 133, 134, 137, 138, but the disclosure is not limited in this respect. Alternatively, the plurality of processing chains 130 may be limited to receive processing chains, or alternatively, limited to transmit processing chains. Or the number of receive processing chains may not be the same as the number of transmit processing chains. Also, the plurality of processing chains 130 is shown as having eight processing chains 131-138, but the disclosure is not limited in this respect either; there may be any number of processing chains as suitable for the intended purpose.

The combined processor 140 comprises a dynamic antenna diversity controller 142, which is configured to activate one or more of the plurality of processing chains 131-138 based on a predetermined set of criteria. The dynamic antenna diversity controller 142 receives input signals, which represent conditions such as any of received signal strength, transmit path loss, quality of service, frequency, bandwidth, signal-to-noise ratio, propagation path delay profile, propagation path delay spread, Doppler spread, velocity, packet error rate, bit error rate, interference strength, cell load, or any other suitable condition. The dynamic antenna diversity controller 142 then processes this information, and based on a predetermined set of criteria, activates the plurality of processing chains 131-138 via the switching circuit 120, which comprises a respective switch for each of the processing chains 131-138.

Figure 2:
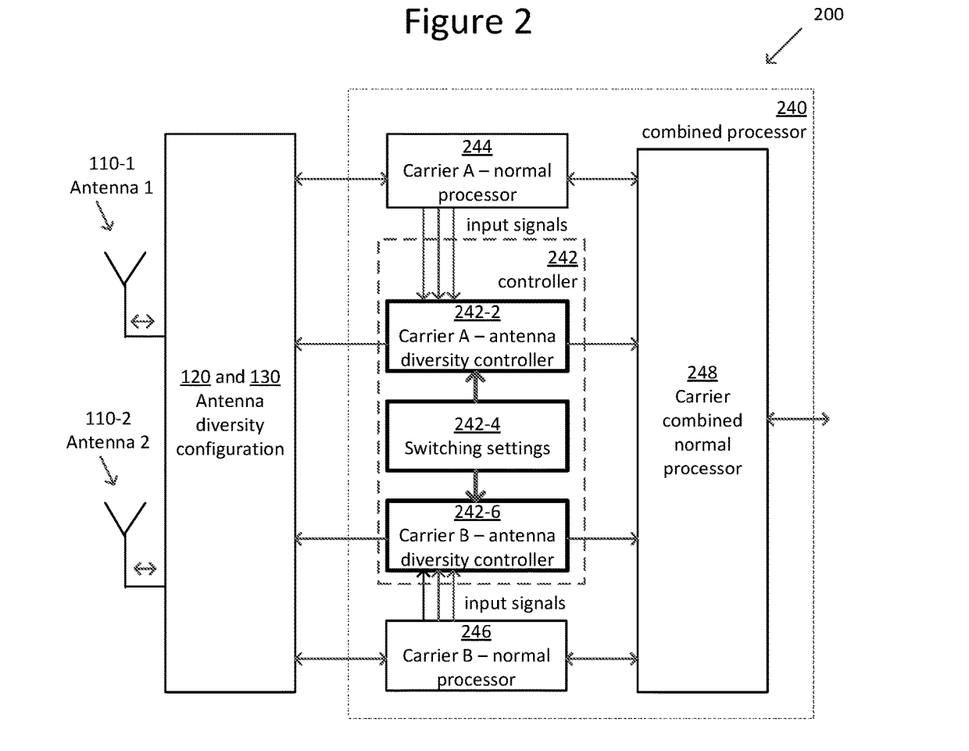
FIG. 2 illustrates a schematic diagram of an antenna diversity circuit in accordance with another aspect of the disclosure.
Figure 3:
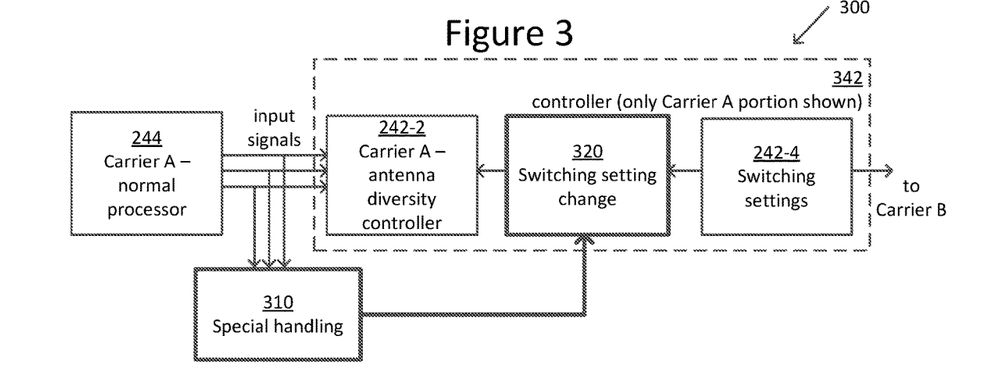
FIG. 3 illustrates a schematic diagram of processing circuit of an antenna diversity circuit in accordance with another aspect of the disclosure.
Figure 4:
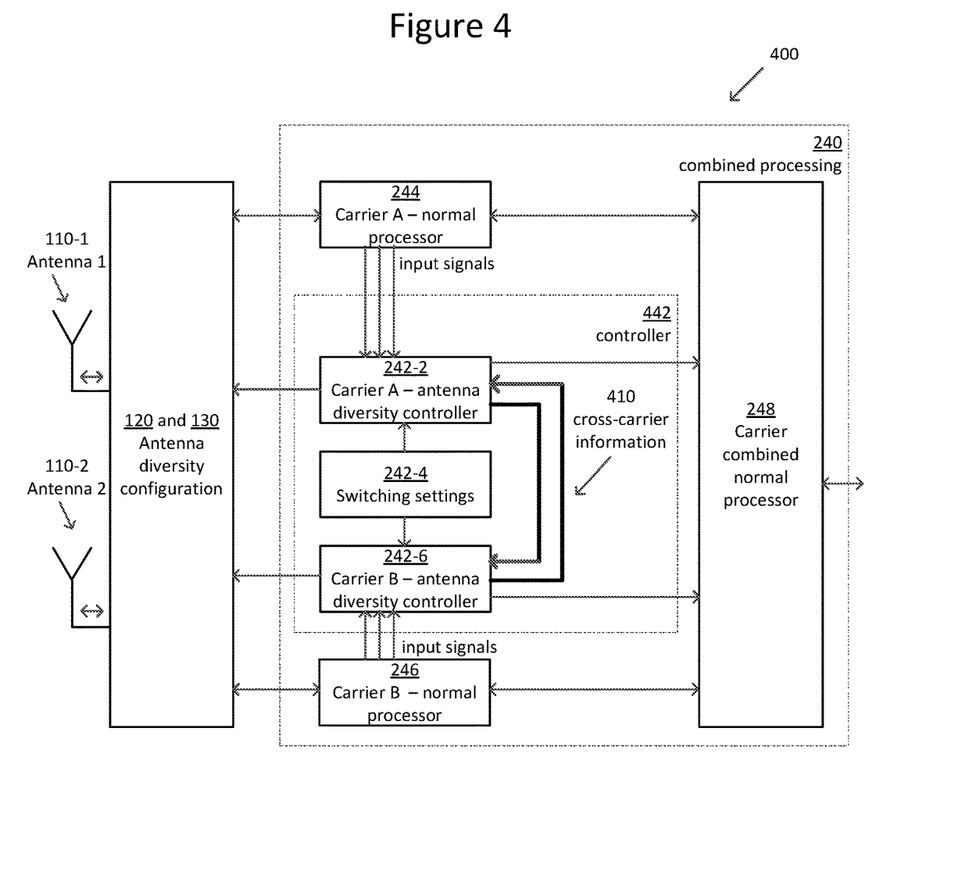
FIG. 4 an antenna diversity circuit in accordance with another aspect of the disclosure.

FIGS. 2-4, described in detail below, illustrate schematic diagrams of dynamic antenna diversity circuits configured to select processing chains communicating with antennas. The selection may be independent per carrier, or alternatively, a selection for one carrier may influence a selection for another carrier.

FIG. 2 illustrates a schematic diagram of an antenna diversity circuit 200 in accordance with another aspect of the disclosure.

The antenna diversity circuit 200 is similar to the antenna diversity circuit 100 of FIG. 1, except for the combined processor 240, which processes the first carrier A and the second carrier B separately rather than together.

The combined processor 240 comprises an antenna diversity controller 242, normal processor 244 for the first carrier A, normal processor 246 for the second carrier B, and carrier combined normal processor 248. Normal processing by a "normal processor" is intended to mean processing as done conventionally, for example equalization, modulation, demodulaton, coding, and decoding.

The controller 242 comprises a first carrier A diversity antenna controller 242-2, switching settings unit 242-4, and second carrier B diversity antenna controller 242-6. The first carrier A diversity antenna controller 242-2 is configured to activate one or more of the plurality of processing chains 131, 133, 135, 137 for the first carrier A. Similarly, the second carrier B diversity antenna controller 242-6 is configured to activate one or more of the plurality of processing chains 132, 134, 136, 138 for the second carrier B. The switching settings unit 242-4 is configured to store antenna diversity switching settings, and may be, for example any memory.

Conditions could be different for each of the first carrier A and the second carrier B due to different propagation conditions. Conditions may be, for example, signal strength in a received signal (downlink), path loss in a transmitted signal (uplink), signal-to-noise ratio (SNR), etc. Propagation conditions may be, for example, frequencies, bands, etc. The condition could vary based on the locations of base stations with different distances to a computing device, or different interference conditions on the carriers, for example, due to different cell loads or distributions of activity of other users on the carriers.

These conditions could result in the antenna diversity controller 242 selecting more than one antenna being used for a same carrier. For example, the antenna diversity controller 242 may activate the first receive processing chain 131 communicating with the first antenna 110-1 for the first carrier A, and the seventh transmit processing chain 137 communicating with the second antenna 110-1 for the same first carrier A.

Alternatively, these conditions could result in the antenna diversity controller 242 selecting a single antenna for a same carrier. For example, the dynamic antenna diversity controller 242 may activate the first receive processing chain 131 communicating with first antenna 110-1 for the first carrier A, and the third transmit processing chain 133 configured to communicate with the first antenna 110-1 for the first carrier A.

Alternatively, these conditions could result in the antenna diversity controller 242 activating more than one transmit processing chain and more than one receive processing chain for the same carrier. For example, the dynamic antenna diversity controller 242 may activate the first receive processing chain 131 configured to communicate with the first antenna 110-1 for the first carrier A, the third transmit processing chain 133 configured to communicate with the first antenna 110-1 for the first carrier A, the fifth receive processing chain 135 configured to communicate with the second antenna 110-2 for the first carrier A, and the seventh transmit processing chain 137 configured to communicate with the second antenna 110-2 for the first carrier A.

FIG. 3 illustrates a schematic diagram of a processing circuit 300 in accordance with another aspect of the disclosure. The processing circuit 300 difference from the corresponding portion in FIG. 2 in that one or more of the carriers may require special handling.

The processing circuit 300 comprises first Carrier A normal processor 244, controller 342 (Carrier A portion only shown), and special handling unit 310.

The controller 342 comprises first Carrier A antenna diversity controller 242-2, switching settings unit 242-4, and switching setting change unit 320. The second Carrier B portion of the controller 342 is not shown, but is basically a mirror image of the Carrier A portion coupled on the other side of switching settings unit 242-4.

The special handling unit 310 is configured to determine if the first Carrier A requires special handling, and if so, instructs the switching setting change unit 320 to change the first Carrier A switching settings.

By way of example, the first carrier A may be a primary carrier carrying control packets for both the first carrier A and the second carrier B, which may be a secondary carrier. The predetermined set of criteria may comprise a higher-standard predetermined criterion and a lower-standard predetermined criterion. In such a case, the dynamic antenna diversity controller 142, 242 may then activate one or more of the plurality of processing chains 131, 133, 135, 137 for the primary first carrier A based on the higher-standard predetermined criterion, and the secondary second carrier B based on the lower-standard predetermined criterion. For example, the primary first carrier A may use both the first antenna 110-1 and the second antenna 110-2, while the secondary second carrier B, on which only data packets are carried, follows a normal dynamic diversity scheme that is less aggressive, that is, only one of the antennas, 110 is used.

By way of another example, the first carrier A and the second carrier B may have different qualities of service. An example could be that first carrier A carries voice packets, such as Voice over LTE or circuit switch packets, and the second carrier B carries data packets or packet switch packets. The first carrier A may receive a voice packet every 20 ms, the voice packet may being 1 ms in length, and the rest of the time the first carrier A is idle. On the other hand the second carrier B, which carries the data packets, has the data packets distributed randomly, that is, data may be downloaded and then the user takes time to read the data before downloading additional data. The voice packets may therefore be carried on one carrier, while the data packets may be carried on two carriers. For example, the dynamic antenna diversity controller may adjust the diversity settings (e.g., criteria thresholds) for the first data carrier A with the voice packets periodically, that is, by switching on a second antenna periodically in order to receive the voice packets at a higher quality.

FIG. 4 illustrates a schematic diagram of an antenna diversity circuit 400 in accordance with another aspect of the disclosure. The antenna diversity circuit 400 differs from the antenna diversity circuit 200 of FIG. 2 in that the first carrier A and the second carrier B may share cross-carrier information 410.

For example, the first carrier A may receive "advanced" information that the second carrier B is scheduled for packet reception. This cross-carrier information 410 is shared from the Carrier A antenna diversity controller 242-2 to the Carrier B antenna diversity controller 242-6 to be used in the antenna diversity decision for Carrier B. The antenna diversity circuit 400 could switch on a processing chain 132, 136 and associated antenna before or just in time for data packet reception, rather than after the second carrier B detects the data packets.

Figure 5:
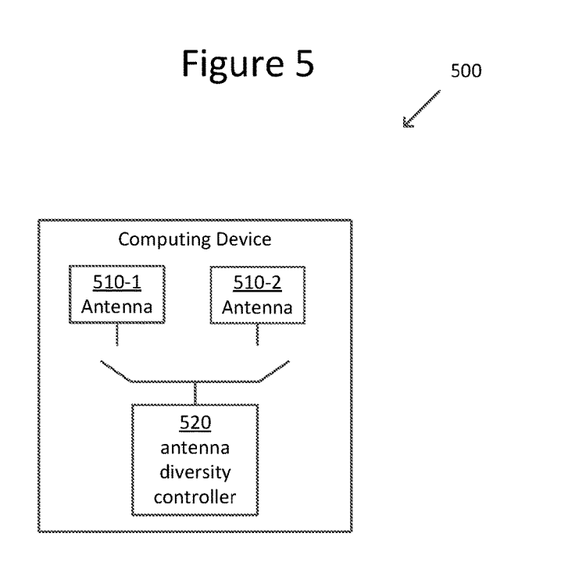
FIG. 5 illustrates a schematic diagram of a computer device in accordance with an aspect of the disclosure.

FIG. 5 illustrates a schematic diagram of a computing device 500 in accordance with an aspect of the disclosure. The computing device 500 may be a cellular phone, base station, tablet, or any other wireless device.

The computing device 500 comprises at least a first antenna 510-1 and a second antenna 510-2, a plurality of processing chains (not shown), and an antenna diversity controller 520. The antenna diversity controller 520 is similar to the antenna diversity controllers 142, 242, 342 described above.

Figure 6:
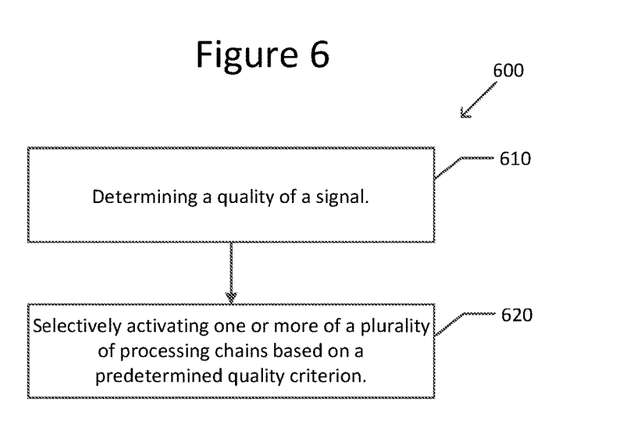
FIG. 6 illustrates a flowchart of an antenna diversity method in accordance with an aspect of the disclosure.

FIG. 6 illustrates a flowchart of an antenna diversity method 600 in accordance with an aspect of the disclosure.

At Step 610, a quality of a signal is determined.

At Step 620, the dynamic antenna diversity controller 142, 242, 342 activates one or more of the plurality of processing chains 131-138 based on a predetermined quality set of criteria.

This disclosure is applicable to any wireless, multi-antenna, multi-carrier system, such as those based on any of fifth generation (5G) wireless mobile telecommunications technologies, Long Term Evolution (LTE), third generation (3G) wireless mobile telecommunications technologies, wireless fidelity (WiFi), etc. 3G may include Universal Mobile Telecommunications System (UMTS), which may include the system enhancement High Speed Packet Access (HSPA), Global System for Mobile Communications (GSM), which may include system enhancements General Packet Radio System (GPRS) and Enhanced Data rates for GSM Evolution (EDGE) and Code Division Multiple Access (CDMA2000).

The following examples pertain to further embodiments.

Example 1 is an antenna diversity circuit, comprising: a plurality of processing chains comprising: first and second processing chains configured to communicate with a first antenna, and process signals for first and second carriers, respectively; and third and fourth processing chains configured to communicate with a second antenna, and process signals for the first and second carriers, respectively; and a dynamic antenna diversity controller configured to activate one or more of the plurality of processing chains based on a predetermined set of criteria.

In Example 2, the subject matter of Example 1, wherein the processing chains are receive processing chains.

In Example 3, the subject matter of Example 1, wherein the processing chains are transmit processing chains.

In Example 4, the subject matter of Example 1, wherein: the first, second, third, and fourth processing chains are receive processing chains, and the plurality of processing chains further comprises: fifth and sixth transmit processing chains configured to communicate with the first antenna, and process signals for the first and second carriers, respectively; and seventh and eight transmit processing chains configured to communicate with the second antenna, and process signals for the first and second carriers, respectively.

In Example 5, the subject matter of Example 4, wherein the dynamic antenna diversity controller is further configured to activate the first receive processing chain configured to communicate with the first antenna for the first carrier, and the fifth transmit processing chain configured to communicate with the second antenna for the first carrier.

In Example 6, the subject matter of Example 4, wherein the dynamic antenna diversity controller is further configured to activate the first receive processing chain configured to communicate with the first antenna for the first carrier, and the fifth transmit processing chain configured to communicate with the first antenna for the first carrier.

In Example 72, the subject matter of Example 1, wherein: the first carrier is a primary carrier, and the second carrier is a secondary carrier, the predetermined set of criteria comprises a higher-standard predetermined criterion and a lower-standard predetermined criterion, and the dynamic antenna diversity controller is further configured to activate the one or more of the plurality of processing chains for the first carrier based on the higher-standard predetermined criterion, and the second carrier based on the lower-standard predetermined criterion.

In Example 8, the subject matter of Example 7, wherein the first carrier carries control packets for both the first carrier and the second carrier.

In Example 9, the subject matter of Example 1, wherein the dynamic antenna diversity controller is further configured to activate the one or more of the plurality of processing chains for the second carrier based on advanced control packets carried on the first carrier.

In Example 10, the subject matter of Example 9, wherein the advanced control packets comprise control information that the second carrier is scheduled for packet reception.

In Example 11, the subject matter of Example 10, wherein the dynamic antenna diversity controller is further configured to activate at least one of the plurality of processing chains for the second carrier based on the advanced control information in time for the packet reception.

In Example 12, the subject matter of Example 1, wherein: the second carrier has a higher quality of service than the first carrier, and the dynamic antenna diversity controller is further configured to activate the one or more of the plurality of processing chains for the second carrier periodically.

In Example 13, the subject matter of Example 12, wherein the first carrier carries data packets, and the second carrier carries voice packets.

In Example 14, the subject matter of Example 1, wherein the predetermined set of criteria is based on a condition.

In Example 15, the subject matter of Example 14, where the condition is selected from a group of conditions consisting of received signal strength, transmit path loss, quality of service, frequency, bandwidth, signal-to-noise ratio, propagation path delay profile, propagation path delay spread, Doppler spread, velocity, packet error rate, bit error rate, interference strength, and cell load.

Example 16 is an antenna diversity method, comprising: determining a quality of a signal; and activating, by a dynamic antenna diversity controller, one or more of a plurality of processing chains based on a predetermined set of quality criteria, wherein the plurality of processing chains comprises: first and second processing chains configured to communicate with a first antenna, and process signals for first and second carriers, respectively, and third and fourth processing chains configured to communicate with a second antenna, and process signals for the first and second carriers, respectively In Example 17, the subject matter of Example 16, wherein the signal is a received signal, and the processing chains are receive processing chains.

In Example 18, the subject matter of Example 16, wherein the signal is a transmitted signal, and the processing chains are transmit processing chains.

In Example 19, the subject matter of Example 16, wherein: the first carrier is a primary carrier, and the second carrier is a secondary carrier, the predetermined set of quality criteria comprises a higher-standard predetermined quality criterion and a lower-standard predetermined quality criterion, and the activating comprises activating the one or more of the plurality of processing chains for the first carrier based on the higher-standard predetermined quality criterion, and the second carrier based on the lower-standard predetermined quality criterion.

In Example 20, the subject matter of Example 19, wherein the first carrier carries control packets for both the first carrier and the second carrier.

In Example 21, the subject matter of Example 16, further comprising: receiving advanced control packets carried on the first carrier, wherein the activating comprises activating, based the advanced control packets, the one or more of the plurality of processing chains for the second carrier.

In Example 22, the subject matter of Example 21, wherein the advanced control packets comprise control information that the second carrier is scheduled for packet reception.

In Example 23, the subject matter of Example 22, wherein the activating comprises activating at least one of the plurality of processing chains for the second carrier based on the advanced control information in time for the packet reception.

In Example 24, the subject matter of Example 16, wherein: the second carrier has a higher quality of service than the first carrier, and the activating comprises activating the one or more of the plurality of processing chains for the second carrier periodically.

In Example 25, the subject matter of Example 16, wherein the predetermined set of quality criterion is selected from a group of quality criterion consisting of received signal strength, transmit path loss, quality of service, frequency, bandwidth, signal-to-noise ratio, propagation path delay profile, propagation path delay spread, Doppler spread, velocity, packet error rate, bit error rate, interference strength, and cell load.

Example 26 is an antenna diversity circuit, comprising: a plurality of processing chains comprising: first and second processing chains for communicating with a first antenna, and processing signals for first and second carriers, respectively; and third and fourth processing chains for communicating with a second antenna, and processing signals for the first and second carriers, respectively; and a dynamic antenna diversity controller for activating one or more of the plurality of processing chains based on a predetermined set of quality criteria.

In Example 27, the subject matter of Example 26, wherein the processing chains are receive processing chains.

In Example 28, the subject matter of Example 26, wherein the processing chains are transmit processing chains.

In Example 29, the subject matter of Example 26, wherein: the first, second, third, and fourth processing chains are receive processing chains, and the plurality of processing chains further comprises: fifth and sixth transmit processing chains for communicating with the first antenna, and processing signals for the first and second carriers, respectively; and seventh and eight transmit processing chains for communicating with the second antenna, and processing signals for the first and second carriers, respectively.

In Example 30, the subject matter of Example 29, wherein the dynamic antenna diversity controller is further for activating the first receive processing chain for communicating with the first antenna for the first carrier, and the fifth transmit processing chain for communicating with the second antenna for the first carrier.

In Example 31, the subject matter of Example 29, wherein the dynamic antenna diversity controller is further for activating the first receive processing chain for communicating with the first antenna for the first carrier, and the fifth transmit processing chain for communicating with the first antenna for the first carrier.

In Example 32, the subject matter of Example 26, wherein: the first carrier is a primary carrier, and the second carrier is a secondary carrier, the predetermined set of criteria comprises a higher-standard predetermined criterion and a lower-standard predetermined criterion, and the dynamic antenna diversity controller is further for activating the one or more of the plurality of processing chains for the first carrier based on the higher-standard predetermined criterion, and the second carrier based on the lower-standard predetermined criterion.

In Example 33, the subject matter of Example of any of Examples 26-32, wherein the first carrier carries control packets for both the first carrier and the second carrier.

In Example 34, the subject matter of Example of any of Examples 26-32, wherein the dynamic antenna diversity controller is further for activating the one or more of the plurality of processing chains for the second carrier based on advanced control packets carried on the first carrier.

In Example 35, the subject matter of Example 34, wherein the advanced control packets comprise control information that the second carrier is scheduled for packet reception.

In Example 36, the subject matter of Example 35, wherein the dynamic antenna diversity controller is further for activating at least one of the plurality of processing chains for the second carrier based on the advanced control information in time for the packet reception.

In Example 37, the subject matter of Example 26, wherein: the second carrier has a higher quality of service than the first carrier, and the dynamic antenna diversity controller is further for activating the one or more of the plurality of processing chains for the second carrier periodically.

In Example 38, the subject matter of Example 37, wherein the first carrier carries data packets, and the second carrier carries voice packets.

In Example 39, the subject matter of Example 26, wherein the predetermined set of criteria is based on a condition.

In Example 40, the subject matter of Example 39, where the condition is selected from a group of conditions consisting of received signal strength, transmit path loss, quality of service, frequency, bandwidth, signal-to-noise ratio, propagation path delay profile, propagation path delay spread, Doppler spread, velocity, packet error rate, bit error rate, interference strength, and cell load.

Example 41 is an apparatus substantially as shown and described.

Example 42 is a method substantially as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An antenna diversity circuit, comprising:
 a plurality of processing chains comprising:
  first and second processing chains configured to communicate with a first antenna, and process signals for first and second carriers, respectively; and
  third and fourth processing chains configured to communicate with a second antenna, and process signals for the first and second carriers, respectively; and a dynamic antenna diversity controller configured to activate one or more of the plurality of processing chains on a per carrier basis, the activation being based on an initial predetermined set of criteria corresponding to one or more observed conditions associated with the first and second carriers, wherein the dynamic antenna diversity controller is further configured to selectively change the initial predetermined set of criteria on a per carrier basis based upon a type of data carried by the first carrier and the second carrier.

2. The antenna diversity circuit of claim 1, wherein the processing chains are receive processing chains.

3. The antenna diversity circuit of claim 1, wherein the processing chains are transmit processing chains.

4. The antenna diversity circuit of claim 1, wherein:
the first, second, third, and fourth processing chains are receive processing chains, and
the plurality of processing chains further comprises:
fifth and sixth transmit processing chains configured to communicate with the first antenna, and process signals for the first and second carriers, respectively; and
seventh and eight transmit processing chains configured to communicate with the second antenna, and process signals for the first and second carriers, respectively.

5. The antenna diversity circuit of claim 4, wherein the dynamic antenna diversity controller is further configured to activate the first receive processing chain configured to communicate with the first antenna for the first carrier, and the seventh transmit processing chain configured to communicate with the second antenna for the first carrier.

6. The antenna diversity circuit of claim 4, wherein the dynamic antenna diversity controller is further configured to activate the first receive processing chain configured to communicate with the first antenna for the first carrier, and the fifth transmit processing chain configured to communicate with the first antenna for the first carrier.

7. The antenna diversity circuit of claim 1, wherein:
the first carrier is a primary carrier, and the second carrier is a secondary carrier,
the initial predetermined set of criteria comprises a higher-standard predetermined criterion and a lower-standard predetermined criterion, and
the dynamic antenna diversity controller is further configured to activate the one or more of the plurality of processing chains for the first carrier based on the higher-standard predetermined criterion, and the second carrier based on the lower-standard predetermined criterion.

8. The antenna diversity circuit of claim 7, wherein the first carrier carries control packets for both the first carrier and the second carrier.

9. The antenna diversity circuit of claim 1, wherein the dynamic antenna diversity controller is further configured to change the initial predetermined set of criteria based on advanced control packets carried on the first carrier to activate the one or more of the plurality of processing chains for the second carrier.

10. The antenna diversity circuit of 9, wherein the advanced control packets comprise control information that the second carrier is scheduled for packet reception.

11. The antenna diversity circuit of claim 10, wherein the dynamic antenna diversity controller is further configured to change the initial predetermined set of criteria based on the advanced control information to activate at least one of the plurality of processing chains for the second carrier in time for the packet reception.

12. The antenna diversity circuit of claim 1, wherein the dynamic antenna diversity controller is further configured to activate the one or more of the plurality of processing chains for the second carrier periodically by changing the initial predetermined set of criteria when the second carrier has a higher quality of service than the first carrier.

13. The antenna diversity circuit of claim 1, wherein the dynamic antenna diversity controller is further configured to change the initial predetermined set of criteria when the first carrier carries packet switch packets and the second carrier carries circuit switch packets.

14. The antenna diversity circuit of claim 1, where the one or more observed conditions include one or more of received signal strength, transmit path loss, quality of service, frequency, bandwidth, signal-to-noise ratio, propagation path delay profile, propagation path delay spread, Doppler spread, velocity, packet error rate, bit error rate, interference strength, and cell load.

15. The antenna diversity circuit of claim 1, wherein the dynamic antenna diversity controller is further configured to change the predetermined set of criteria for the second carrier based on advanced control packets received via the first carrier to activate the one or more of the plurality of processing chains for the second carrier before receiving data via the second carrier.

16. An antenna diversity method, comprising:
determining one or more observed conditions associated with a first and second carrier, respectively; and
activating, by a dynamic antenna diversity controller, one or more of a plurality of processing chains on a per carrier basis, the activation being based on an initial predetermined set of criteria corresponding to the one or more observed conditions,
wherein the plurality of processing chains comprises:
first and second processing chains configured to communicate with a first antenna, and process signals for the first and second carriers, respectively, and
third and fourth processing chains configured to communicate with a second antenna, and process signals for the first and second carriers, respectively; and
selectively changing the initial predetermined set of criteria on a per carrier basis based upon a type of data carried by the first carrier and the second carrier.

17. The antenna diversity method of claim 16, wherein the first and second carriers are associated with a first and a second received signal, respectively, and the processing chains are receive processing chains.

18. The antenna diversity method of claim 16, wherein the first and second carriers are associated with a first and a second transmitted signal, respectively, and the processing chains are transmit processing chains.

19. The antenna diversity method of claim 16, wherein:
the first carrier is a primary carrier, and the second carrier is a secondary carrier,
the initial predetermined set of criteria comprises a higher-standard predetermined set of criteria and a lower-standard predetermined set of criteria, and
the activating comprises activating the one or more of the plurality of processing chains for the first carrier based on the higher-standard predetermined set of criteria, and the second carrier based on the lower-standard predetermined set of criteria.

20. The antenna diversity method of claim 19, wherein the first carrier carries control packets for both the first carrier and the second carrier.

21. The antenna diversity method of claim 16, further comprising:
changing the predetermined set of criteria based on receiving advanced control packets carried on the first carrier, to perform
the activating of the one or more of the plurality of processing chains for the second carrier.

22. The antenna diversity method of 21, wherein the advanced control packets comprise control information that the second carrier is scheduled for packet reception.

23. The antenna diversity method of claim 22, further comprising:
changing the predetermined set of criteria based on receiving the advanced control information to perform the activating of the one or more of the plurality of processing chains for the second carrier in time for the packet reception.

24. The antenna diversity method of claim 16, further comprising:
changing the predetermined set of criteria based on the second carrier having a higher quality of service than the first carrier
to perform the activating comprises of the one or more of the plurality of processing chains for the second carrier periodically.

25. The antenna diversity method of claim 16, wherein the one or more observed conditions include one or more of received signal strength, transmit path loss, quality of service, frequency, bandwidth, signal-to-noise ratio, propagation path delay profile, propagation path delay spread, Doppler spread, velocity, packet error rate, bit error rate, interference strength, and cell load.

* * * * *